US010956037B2

(12) United States Patent
Atia et al.

(10) Patent No.: US 10,956,037 B2
(45) Date of Patent: Mar. 23, 2021

(54) PROVISIONING STORAGE ALLOCATION USING PRIORITIZED STORAGE SYSTEM CAPABILITIES

(71) Applicant: International Business Machines Corporation, Armonk, NY (US)

(72) Inventors: Ohad Atia, Haifa (IL); Amalia Avraham, Petach Tikva (IL); Ran Harel, Kfar-Saba (IL); Alon Marx, Matan (IL)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 14/996,279

(22) Filed: Jan. 15, 2016

(65) Prior Publication Data

US 2017/0206012 A1    Jul. 20, 2017

(51) Int. Cl.
*G06F 3/06* (2006.01)
*G06Q 30/02* (2012.01)

(52) U.S. Cl.
CPC .............. *G06F 3/0604* (2013.01); *G06F 3/06* (2013.01); *G06F 3/067* (2013.01); *G06F 3/0631* (2013.01); *G06Q 30/02* (2013.01)

(58) Field of Classification Search
CPC .................................. G06F 3/06; G06Q 30/02
See application file for complete search history.

(56) References Cited

U.S. PATENT DOCUMENTS

| 8,204,772 | B2* | 6/2012 | Babazadeh | G06Q 10/063 |
| | | | | 705/7.11 |
| 9,411,815 | B1* | 8/2016 | Lu | G06F 11/1446 |
| 2003/0055718 | A1* | 3/2003 | Cimini | G06Q 10/0639 |
| | | | | 705/7.38 |
| 2005/0071596 | A1* | 3/2005 | Aschoff | G06F 9/5016 |
| | | | | 711/170 |
| 2007/0233868 | A1* | 10/2007 | Tyrrell | G06F 3/0605 |
| | | | | 709/226 |
| 2008/0270223 | A1* | 10/2008 | Collins | G06Q 30/02 |
| | | | | 705/14.42 |
| 2009/0043958 | A1 | 2/2009 | Kaneda et al. | |
| 2012/0224217 | A1* | 9/2012 | Oba | G06F 3/1211 |
| | | | | 358/1.15 |
| 2013/0067187 | A1 | 3/2013 | Moss et al. | |

(Continued)

OTHER PUBLICATIONS

Hoagland, "Storage Technology: Capabilities and Limitations", An IP.com Prior Art Database Technical Disclosure, IP.com No. 000148814, Original Publication Date: May 8, 1979, IP.com Electronic Publication: Mar. 30, 2007, pp. 1-26, © Software Patent Institute.

(Continued)

*Primary Examiner* — Charles Rones
*Assistant Examiner* — Tian-Pong Chang
(74) *Attorney, Agent, or Firm* — Reza Sarbakhsh

(57) ABSTRACT

Embodiments of the present invention provide methods and systems for calculating capacity allocation in storage systems. Embodiments of the present invention can be used to calculate a capabilities score for all storage systems, resulting in a list of storage systems, prioritized, so that a storage administrator may select automatically or manually, the best system to provision for the requesting application, based on the calculated capabilities score of each storage system.

21 Claims, 3 Drawing Sheets

(56) References Cited

U.S. PATENT DOCUMENTS

| | | | | |
|---|---|---|---|---|
| 2013/0275396 A1* | 10/2013 | Condict | ............... | H03M 7/30 |
| | | | | 707/693 |
| 2013/0311650 A1 | 11/2013 | Brandwine et al. | | |
| 2014/0223428 A1* | 8/2014 | Hackett | ............... | G06F 9/5088 |
| | | | | 718/1 |
| 2015/0039831 A1* | 2/2015 | Auvenshine | ......... | G06F 3/0643 |
| | | | | 711/118 |
| 2015/0095105 A1* | 4/2015 | Fitts | ................ | G06Q 10/067 |
| | | | | 705/7.29 |
| 2017/0060953 A1* | 3/2017 | Ackerman | ........ | G06F 16/24554 |

OTHER PUBLICATIONS

Le Faucheur et al., "RSVP Extensions for Admission Priority (RFC6401)", An IP.com Prior Art Database Technical Disclosure, IP.com No. 000213097, Original Publication Date: Oct. 1, 2011, IP.com Electronic Publication: Dec. 4, 2011, pp. 1-32.

\* cited by examiner

PROVISIONING STORAGE ALLOCATION USING PRIORITIZED STORAGE SYSTEM CAPABILITIES

BACKGROUND OF THE INVENTION

The present invention relates generally to the field of storage management, and more particularly to provisioning storage allocation using prioritized storage system capabilities.

In an abstracted cloud environment, a storage administrator builds systems in an aggregated manner, consolidating many different storage systems under a single storage service or virtual storage system. Each of these storage systems may contain different qualities or features. A storage device may allocate capacity for spaces (e.g., logical volumes) according to an allocation strategy, e.g., allocating capacity from the storage device having the greatest available capacity, or maximizing the distribution of allocated capacity across the storage devices.

SUMMARY

According to an embodiment of the present invention, a method, computer program product, and computer system for capacity allocation by prioritized capabilities are provided. The method comprises: receiving, by one or more computer processors, a set of capability conditions; calculating, by one or more computer processors, a capability score for each storage system, based on the received set of capability conditions; sorting, by one or more computer processors, each storage system, according to the calculated capability score; and selecting, by one or more computer processors, a storage system for use, based in part on the calculated capability score and a set of requirements of a user.

DETAILED DESCRIPTION

Embodiments of the present invention provide systems and methods for attaching a score to a storage system according to the capabilities of the system and/or the requirements of an application, in order to produce a list of prioritized storage systems, from which a storage administrator may select, for a requesting application.

Figure 1:
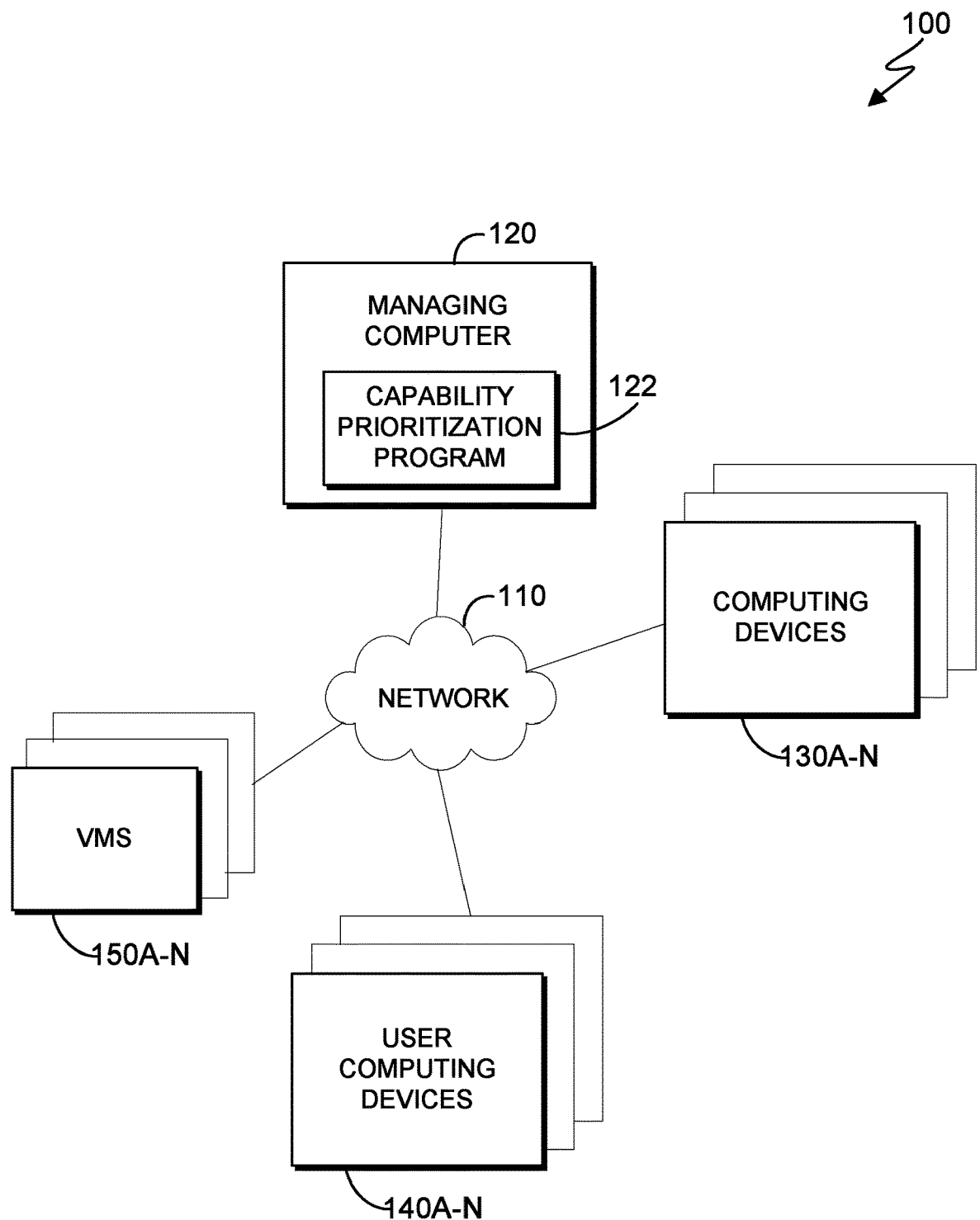
FIG. 1 depicts a block diagram illustrating a storage system environment, in accordance with an embodiment of the present invention.

The present invention will now be described in detail with reference to the Figures. FIG. 1 depicts a block diagram illustrating a storage system environment, generally designated 100, in accordance with an embodiment of the present invention. Modifications to storage system environment 100 may be made by those skilled in the art without departing from the scope of the invention as recited by the claims. In an exemplary embodiment, storage system environment 100 includes managing computer 120, computing devices 130A-N, user computing devices 140A-N, and VMs 150A-N, interconnected over network 110.

In some embodiments, managing computer 120 is executed or embodied by one or more physical or virtual computing systems. For example, in some embodiments a server computing system that has components including a CPU, I/O components, storage, and memory may be used to execute the managing computer 120. An embodiment of the managing computer 120 can be stored as one or more executable program modules in the memory of the server, and the managing computer 120 can interact with the physical computing devices 130A-N and/or VMs 150A-N, over network 110. Managing computer 120 can receive requests from users for computing resources of the program execution via network 110.

Network 110 can be, for example, a local area network (LAN), a wide area network (WAN) such as the Internet, the public switched telephone network (PSTN), a mobile data network (e.g., wireless Internet provided by a third or fourth generation of mobile phone mobile communication), a private branch exchange (PBX), any combination thereof, or any combination of connections and protocols that will support communications between computing devices 130A-N in accordance with an embodiment of the present invention. Network 110 may include wired, wireless, or fiber optic connections. In some embodiments, network 110

Managing computer 120 includes capability prioritization program 122. Capability prioritization program 122 attaches a score to the storage system, according to the capabilities of the storage system and the requirements of a requesting application. Capability prioritization program 122 prioritizes a list of storage systems, so that managing computer 120 may automatically or manually select the best system to provision for a requesting application. In this exemplary embodiment, at least some of the user computing devices 140A-N may be remote from the managing computer 120.

In various embodiments of the present invention, managing computer 120, user computing devices 140A-N and computing devices 130A-N can be a laptop computer, a tablet computer, a netbook computer, a personal computer (PC), a desktop computer, a personal digital assistant (PDA), a smart phone, a thin client, a wearable device, or any programmable mobile electronic device capable of executing computer readable program instructions. In an embodiment of the present invention, managing computer 120, user computing devices 140A-N, and computing devices 130A-N can represent a computing system utilizing clustered computers and components to act as a single pool of seamless resources when accessed through a network, such as network 110. Managing computer 120, user computing devices 140A-N, and computing devices 130A-N may include internal and external hardware components, as depicted and described in further detail with respect to FIG. 3.

Figure 2:
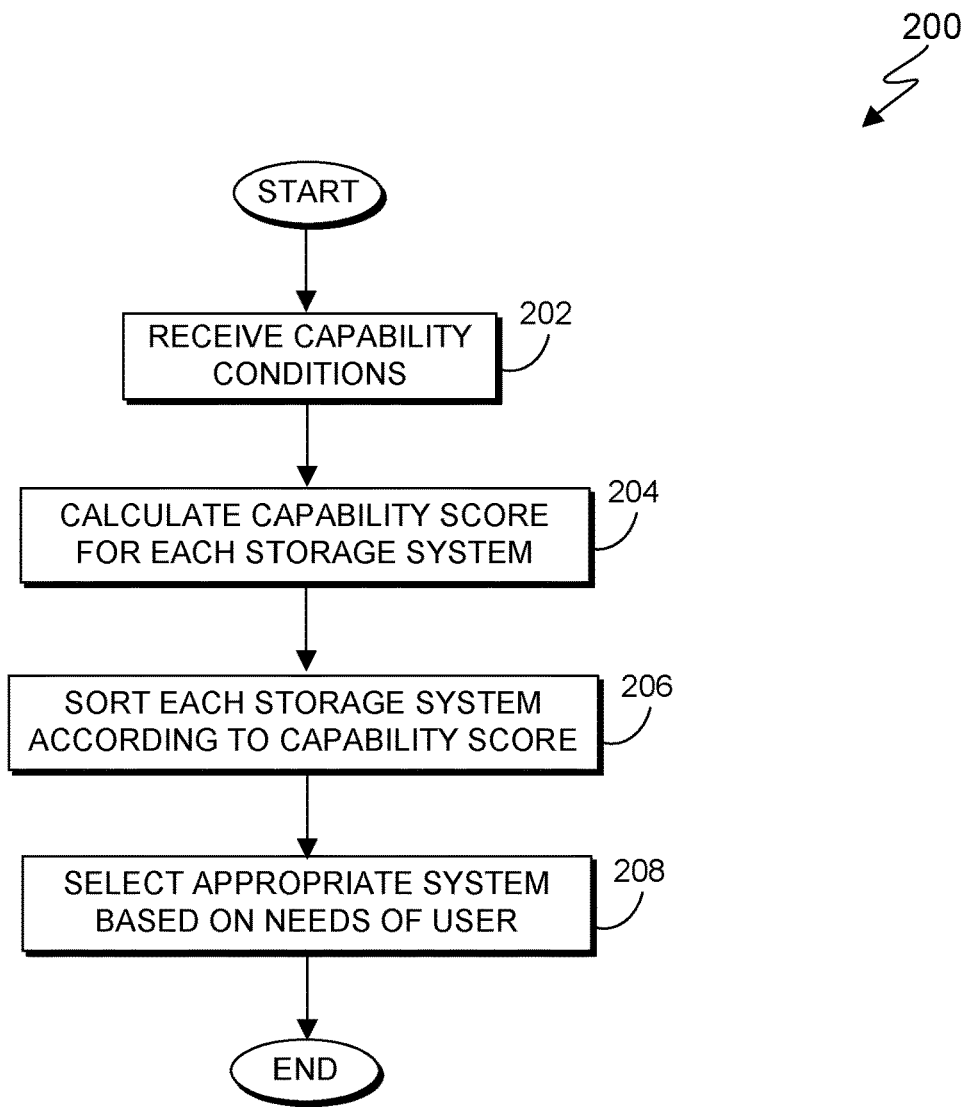
FIG. 2 depicts a flowchart diagram illustrating operational steps for assigning a score to each storage system and creating a list of prioritized storage systems, in accordance with an embodiment of the present invention.

FIG. 2 depicts a flowchart illustrating operational steps for assigning a score to each storage system and creating a list of prioritized storage systems, in accordance with an embodiment of the present invention. In this disclosure, storage capabilities are defined as storage system features and service specifications, that can be satisfied by a storage system and represent possible storage requirements.

In step 202, capability prioritization program 122 receives capability conditions. A requested capability is defined as a condition defined by the user that the storage system may, or may not, fulfill, for the purposes of the present disclosure. In this exemplary embodiment, the condition is compiled of: <attribute> <comparison> <value>. For example, possible storage requirements may include: encryption=true, compression >50%, and thin provisioning=false. For a set of 1 ... n possible capabilities, capability $C_i$ is defined as a capability condition of index 'I' in the present set. In some embodiments, capability conditions may include: whether a capability is mandatory, a capability weight, and/or a capability value within a storage system. For example, a user may define a capability as mandatory, or not mandatory, where $M_i$ is '1' if capability $C_i$ is mandatory, and is '0' if capability $C_i$ is not mandatory. A user may define a 'weight' of a capability based on the requirements of the user, which represents the priority of the capability relative to all of the other priorities of each capability. $W_i$ can be defined as the weight of the capability $C_i$. In this embodiment, all weights have a value between '0' and '1', such that $\Sigma_i W_i = 1$. In some embodiments, a normalization is performed, if necessary. In this embodiment, for a storage system a, a value $C_{ai}$ represents whether or not capability $C_i$ is supported in the storage system. For example, $C_{ai}$ has a value of '1' if the capability condition is met in the storage system, and has a value of '0' if the condition is not met.

In step 204, capability prioritization program 122 calculates a capability score for each storage system. In this exemplary embodiment, capability prioritization program 122 calculates a capability score, based on the received, user-defined, capability conditions. Using equation 1, $$CS_a = \Pi_i(!M_i \text{ or } (M_i \& C_{ai})) * \Sigma_i W_i C_{ai} \qquad \text{(Equation 1)}$$

a capability score can be calculated, in which the equation equals 0 if one of the mandatory capabilities is not met, or a weighted score for all of the existing capabilities, in the case that all of the mandatory capabilities are met.

In step 206, capability prioritization program 122 sorts each storage system according to the capability score. In this exemplary embodiment, capability prioritization program 122 sorts each storage system, based on the calculated capability score, according to the needs of the user. In this exemplary embodiment, an implementation quality, $Q_{ai}$, of capability $C_i$ in storage system a is defined as a value between '0' and '1'. This value represents the quality of the implementation, relative to all possible implementations. A value of '0' indicates that a capability is not implemented at all in the storage system, or that the capability condition was not met.

For example, if the capability condition requested by a user is a compression of at least ×3, then a compression of ×2 is represented as $Q_{ai}=0$, because although compression was implemented, the requested capability condition was not met (i.e., at least ×3 compression was requested and less than ×3 was implemented). However, a storage system of compression rate ×5 will have a higher $Q_{ai}$ than a storage system with compression rate ×3. The storage system capability score of equation 1 can be adjusted as follows:

$$CS_a = \Pi_i(!M_i \text{ or } (M_i \& C_{ai})) * \Sigma_i W_i Q_{ai}, \qquad \text{(Equation 2)}$$

where $C_{ai}$ means that the array, a, has a capability i.

The capability score can similarly be defined as:

$$CS_a = \Pi_i(!M_i \text{ or } (M_i \& (Q_{ai} > 0))) * \Sigma_i W_i Q_{ai}, \qquad \text{(Equation 3)}$$

where $Q_{ai} > 0$ means that an array, a, has capability i with score $Q_{ai}$. If $Q_i > 0$, then the array has the indicated capability in at least some quantity (i.e., more than 0).

The sorting and filtering of the storage systems according to their capability score can be applied in a similar manner as described above.

In step 208, capability prioritization program 122 selects an appropriate system, based on the needs of a user. For example, although two storage systems may possess a similar capability (e.g., compression), they may still differ in the way the capability is implemented and in its quality. A compression rate of ×5 is better than a compression rate of ×2, for example. In this example, a user may prefer to use the storage system which implements the capability in the best way.

In this way, the capabilities score for all storage systems results in a list of storage systems, prioritized, so that a storage administrator may select automatically or manually, the best system to provision for the requesting application, based on the calculated capabilities score of each storage system.

Figure 3:
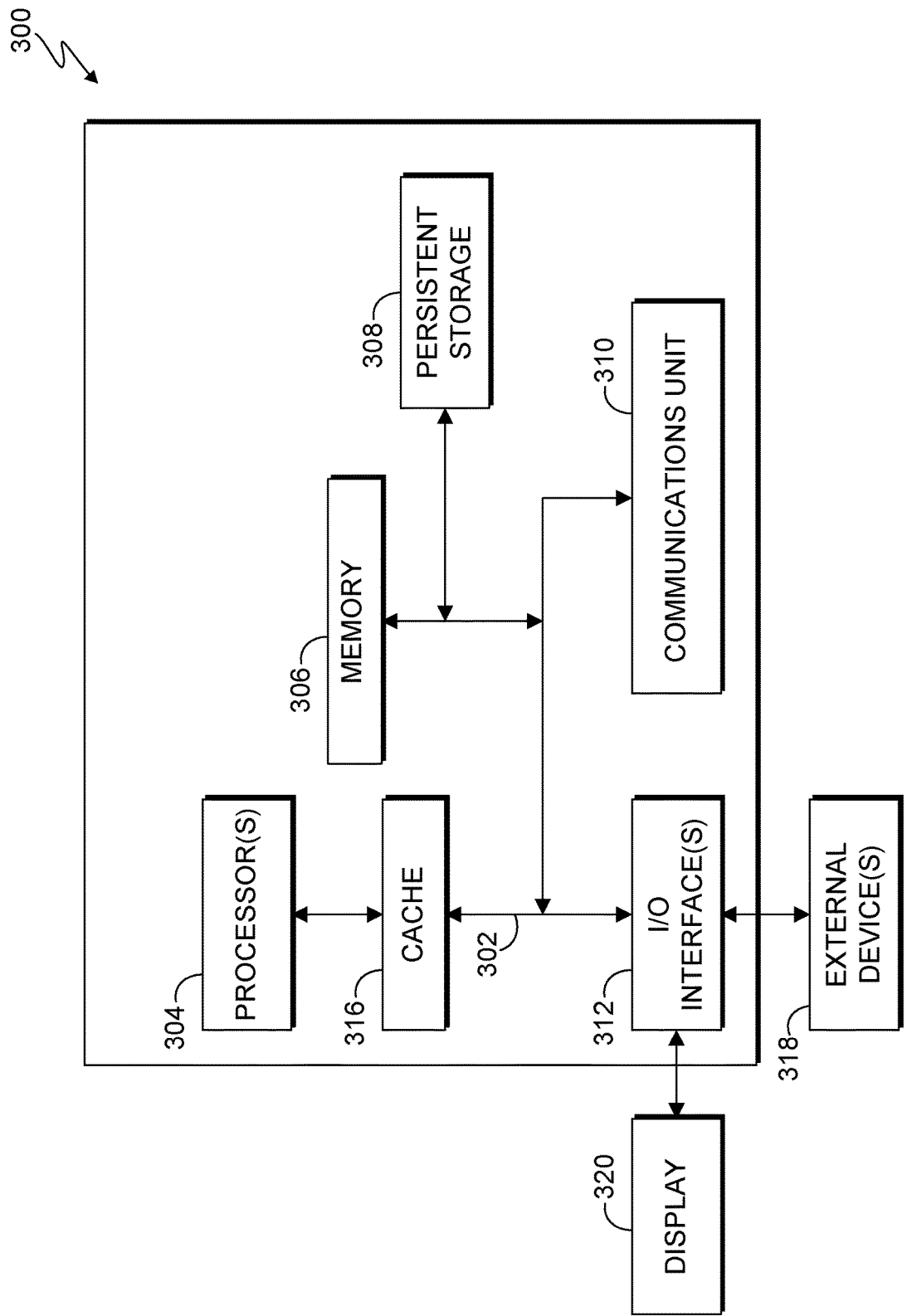
FIG. 3 depicts a block diagram of components of a computing device, in accordance with an illustrative embodiment of the present invention.

FIG. 3 is a block diagram of internal and external components of a computing device, generally designated 300, which is representative of the computing devices of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device 300 includes communications fabric 302, which provides communications between computer processor(s) 304, memory 306, cache 316, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM). In general, memory 306 can include any suitable volatile or non-volatile computer readable storage media. Cache 316 is a fast memory that enhances the performance of processors 304 by holding recently accessed data, and data near recently accessed data, from memory 306.

Program instructions and data used to practice embodiments of the present invention may be stored in persistent storage 308 and in memory 306 for execution by one or more of the respective processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of a network. In these examples, communications unit 310 includes one or more network interface cards. Communications unit 310 may provide communications through the use of either or both physical and wireless communications links. Program instructions and data used to practice embodiments of the present invention may be downloaded to persistent storage 308 through communications unit 310.

I/O interface(s) 312 allows for input and output of data with other devices that may be connected to computing device 300. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for selecting a storage system in a storage system environment comprising different storage systems, the method comprising:
   selecting the storage system for use by the user based on capabilities of the storage system meeting a set of user-defined capability conditions in a format comprising <attribute> <comparison> <value>, wherein the selecting is based on a capability prioritization of the storage system relative to the different storage systems, and wherein the selecting is further based on implementation and quality of at least one user-defined capability condition in the storage system relative to implementation and quality of the at least one user-defined capability condition in another storage system,
   wherein a quality of the at least one user-defined capability condition is determined based on an implementation quality,
   and wherein the selecting is based on all mandatory capabilities being met based on a capability score or based on a weighted score.

2. The method of claim 1, wherein the selecting comprises:
   presenting a list of storage systems to the user for selection; and
   selecting the storage system based on receiving a selection input from the user.

3. The method of claim 2, wherein the list is sorted according to respective calculated capability scores of the different storage systems.

4. The method of claim 1, wherein the set of user-defined capability conditions comprises any one or more of: a capability weight, a mandatory capability, and a capability value within a storage system.

5. The method of claim 3, wherein the list is further sorted according to a set of needs of a user.

6. The method of claim 3, wherein the respective calculated capability scores are calculated based on:
   determining whether all mandatory capability conditions of the set of user-defined capability conditions are met; and
   outputting a weighted score based on the mandatory capability conditions.

7. The method of claim 1, wherein the selecting is either performed by the user or is performed automatically by an automatic storage administrator.

8. A computer program product for selecting a storage system in a storage system environment comprising different storage systems, the computer program product comprising:
   a computer readable storage medium and program instructions stored on the computer readable storage medium, the program instructions comprising program instructions for:
   program instructions for selecting the storage system for use by the user based on capabilities of the storage system meeting a set of user-defined capability conditions in a format comprising <attribute> <comparison> <value>, wherein the selecting is based on a capability prioritization of the storage system relative to the different storage systems, and wherein the selecting is further based on implementation and quality of at least one user-defined capability condition in the storage system relative to implementation and quality of the at least one user-defined capability condition in another storage system,
   wherein a quality of the at least one user-defined capability condition is determined based on an implementation quality,
   and wherein the selecting is based on all mandatory capabilities being met based on a capability score or based on a weighted score.

9. The computer program product of claim 8, wherein the program instructions for selecting comprise program instructions for:
   presenting a list of storage systems to the user for selection; and
   selecting the storage system based on receiving a selection input from the user.

10. The computer program product of claim 9, wherein the list is sorted according to respective calculated capability scores of the different storage systems.

11. The computer program product of claim 8, wherein the set of user-defined capability conditions comprises any one or more of: a capability weight, a mandatory capability, and a capability value within a storage system.

12. The computer program product of claim 10, wherein the list is further sorted according to a set of needs of a user.

13. The computer program product of claim 10, wherein the respective calculated capability scores are calculated based on:
   determining whether all mandatory capability conditions of the set of user-defined capability conditions are met; and
   outputting a weighted score based on the mandatory capability conditions.

14. The computer program product of claim 8, wherein the selecting is either performed by the user or is performed automatically by an automatic storage administrator.

15. A computer system for selecting a storage system in a storage system environment comprising different storage systems, the computer system comprising:
   one or more computer processors;
   one or more computer readable storage media; and
   program instructions stored on the one or more computer readable storage media for execution by at least one of the one or more processors, the program instructions comprising instructions for:

program instructions for selecting the storage system for use by the user based on capabilities of the storage system meeting a set of user-defined capability conditions in a format comprising <attribute> <comparison> <value>, wherein the selecting is based on a capability prioritization of the storage system relative to the different storage systems, and wherein the selecting is further based on implementation and quality of at least one user-defined capability condition in the storage system relative to implementation and quality of the at least one user-defined capability condition in another storage system, wherein a quality of the at least one user-defined capability condition is determined based on an implementation quality, and wherein the selecting is based on all mandatory capabilities being met based on a capability score or based on a weighted score.

16. The computer system of claim 15, wherein the program instructions for selecting comprise program instructions for:

presenting a list of storage systems to the user for selection; and selecting the storage system based on receiving a selection input from the user.

17. The computer system of claim 16, wherein the list is sorted according to respective calculated capability scores of the different storage systems.

18. The computer system of claim 15, wherein the set of user-defined capability conditions comprises any one or more of: a capability weight, a mandatory capability, and a capability value within a storage system.

19. The computer system of claim 16, wherein the list is further sorted according to a set of needs of a user.

20. The computer system of claim 17, wherein the respective calculated capability scores are calculated based on:

determining whether all mandatory capability conditions of the set of user-defined capability conditions are met; and outputting a weighted score based on the mandatory capability conditions.

21. The computer system of claim 15, wherein the selecting is either performed by the user or is performed automatically by an automatic storage administrator.

* * * * *